Aug. 26, 1952  C. W. HOLLINGSWORTH  2,608,452
PISTON AND PISTON RING COMBINATION
Filed Sept. 4, 1948
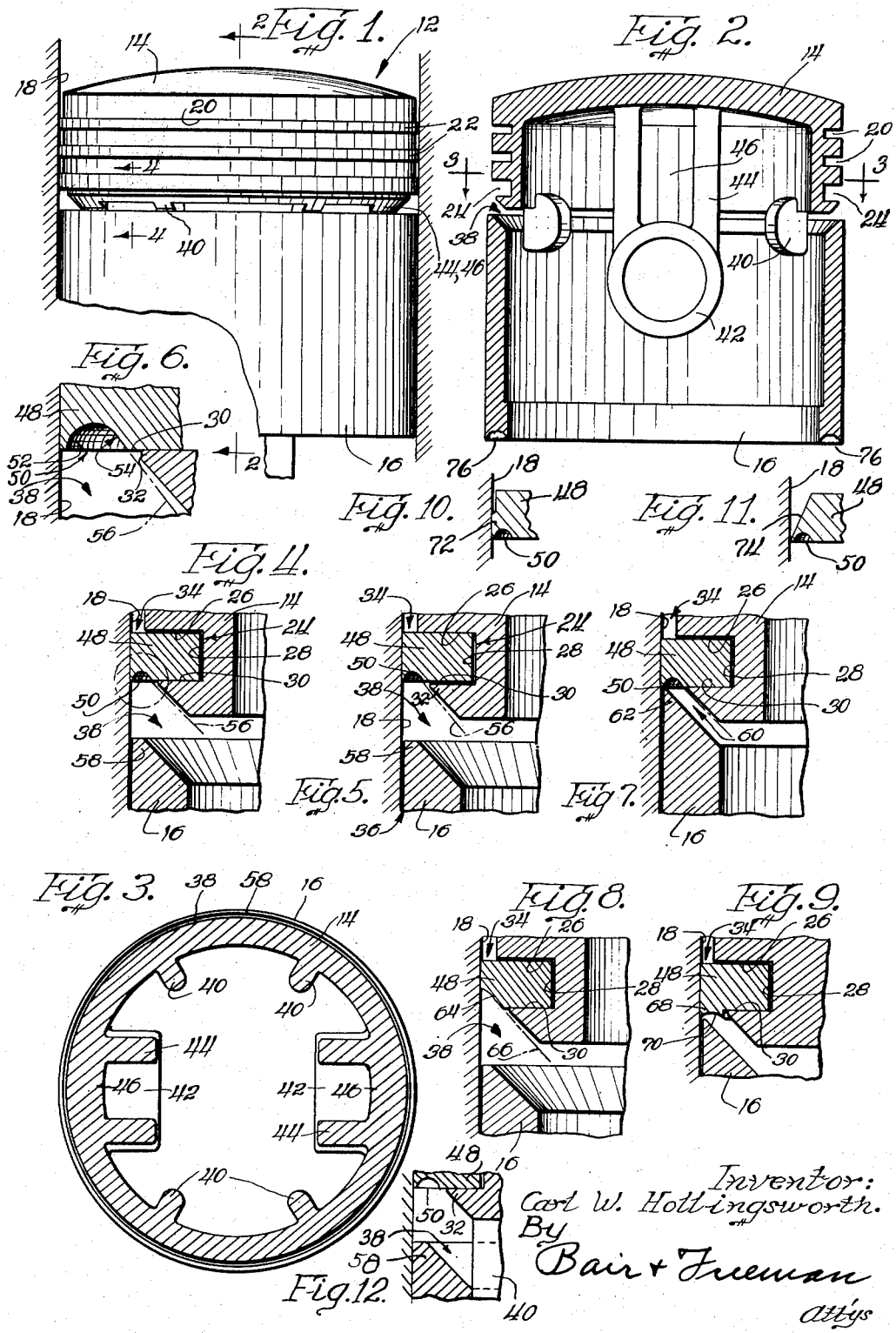
Inventor:
Carl W. Hollingsworth.
By Bair + Freeman
attys Patented Aug. 26, 1952

2,608,452

UNITED STATES PATENT OFFICE 2,608,452

PISTON AND PISTON RING COMBINATION

Carl W. Hollingsworth, Marshalltown, Iowa, assignor of one-half to Thomas J. Kemp, Lincoln, Nebr.

Application September 4, 1948, Serial No. 47,870

19 Claims. (Cl. 309—7)

This invention relates to a piston and piston ring of a certain construction and relation to each other.

The production of a satisfactory piston and piston ring has long been a major problem, and most, if not all, of the constructions in use today are unsatisfactory in a number of particulars.

It is true there are many obstacles to overcome, and the solution of the problem is not simple.

It is most desirous that the rings have sufficiently tight bearing engagement with the cylinder wall and ring groove to attain maximum compression in the combustion chamber; the rings must also be effective to retain the lubricating oil in the crank case and prevent it from entering into the combustion chamber except in the very small amount necessary to lubricate the top of the cylinder wall.

One of the specific difficulties is that the passage of combustion mixture or lubricating oil does not occur only between the rings and cylinder, but it also occurs between the rings and grooves, i. e., through the grooves around the rings. It is usually possible to prevent passage between the rings and cylinder wall, but the problem cannot be solved simply by preventing such passage.

The lubricating oil collects on the cylinder wall in the form of a film each time the piston moves to the top of the cylinder; when the piston descends, the rings should wipe or scrape off the film of oil in excess of the small amount necessary for proper lubrication.

The piston reaches a high rate of speed in its movement in the cylinder, and when a ring encounters the oil at such a speed, the oil takes on the characteristics of a solid. Thus, when the ring encounters the oil at a high rate of speed, the excess oil is not readily wiped or scraped off the cylinder wall, and responds similarly to a solid material, such as metal. As a result, the oil piles up ahead of the ring.

The ring has difficulty in moving the oil along, and something must give way. The ring may then be compressed inwardly which causes the ring to pass over part of the oil on the wall of the cylinder, instead of removing the excess oil. The action may be compared with a scraper or squeegee. If a squeegee is employed to wipe a liquid from a surface, and the squeegee is moved swiftly, the reaction force of the liquid actually lifts the squeegee off the surface, allowing some of the liquid to remain spread on the surface.

If the ring is of sufficient strength to maintain tight engagement with the cylinder wall in spite of all obstacles, the oil piling up ahead of the ring enters into the groove and finds its way in that manner around the ring. Both probably occur simultaneously.

All of the oil that passes by the ring, does not do so by mere inertia of the oil when encountered by the rings, on the intake stroke of the piston, a partial vacuum is created in the combustion chamber and this condition tends to actually draw the oil past the ring into the combustion chamber.

Where two compression rings only are used, and one or two conventional oil rings are also used, a portion of the combustion gases pass by the rings and blow some of the excess oil down into the crank case. This action reduces oil consumption, but dilutes the oil, and also causes loss of power. As the rings wear in, making a tighter seal they seem to act like valves, causing the oil to be pumped into the combustion chamber. This change that takes place often makes the motor work more powerfully on account of the better seal for both intake and power stroke but oil consumption goes up. I feel that excess oil must be removed before it comes in contact with anything but the bottom compression ring.

In order to provide most effectively for removing the excess oil from the cylinder wall, I provide a deflector edge on the under surface of the bottom compression ring, which acts as a plane bit in removing the oil. The deflector edge is curved so that the oil readily travels thereover; and I provide a groove in the piston for the oil to pass into, the groove being open to the interior of the piston at substantially all points around the piston. Thus the excess oil is removed before it comes in contact with the upper compression rings.

The piston and ring construction of the present invention overcomes the disadvantages referred to above. My invention takes into account three very elemental but exceedingly important considerations: (a) a material is to be moved, (b) a place is provided for the material to be moved to, and (c) means is provided for moving the material to the place desired.

An object of the present invention is therefore the provision of a novel piston ring which removes the excess lubricating oil from the cylinder wall in such a manner that the characteristics of a solid, as above referred to, offer the least resistance to the oil being removed.

Another object is the provision of a piston and piston ring comprising a novel construction wherein ample space is provided through which to move the oil after it is removed from the cylinder wall.

A further object of the invention, and a result of the next previous two features, is the provision of a novel piston and piston ring wherein the oil to be removed from the cylinder wall is prevented from being passed over by the ring, either next to the cylinder wall or through the ring groove.

A still further object is the provision of a piston and piston ring in the use of which blow-by is almost completely eliminated.

Another object is the provision of a piston and piston ring in the use of which an oil ring, as it is usually known, is unnecessary.

Many previous types of piston and ring constructions employed openings in the ring grooves in an effort to overcome the objections set out above; I am convinced that such a step does not overcome the objections. For example, much of the lubricating oil and combustion mixture passes relatively through the ring groove and around the ring, and if an opening is provided in the ring groove the passage of the oil through the groove is made more easily.

A still further object of the invention is the provision of a piston and piston ring which accomplishes the above mentioned desired results, without having openings in the ring grooves.

Still another object of the invention is the provision of a piston and piston ring having novel features of construction for carrying out the above objects, which can be made by economical methods, i. e., by the elimination of milling and drilling.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an elevational view of a piston made according to the present invention showing piston rings therein;

Figure 2 is a vertical sectional view taken on line 2—2 of Figure 1, but with the piston rings omitted;

Figure 3 is a horizontal sectional view taken on line 3—3 of Figure 2;

Figure 4 is a greatly enlarged sectional view taken on line 4—4 of Figure 1;

Figure 5 is a view similar to Figure 4, showing the piston ring in raised position;

Figure 6 is a greatly enlarged view of that portion enclosed in dot-dash lines in Figure 4;

Figure 7 is a view similar to Figure 4 showing a slightly different form of piston construction;

Figure 8 is a view similar to Figure 4 showing an alternate form of groove in the piston ring;

Figure 9 is a view similar to Figure 4 showing another form of piston ring and groove in the piston ring;

Figure 10 illustrates a piston ring having a modified form of peripheral surface;

Figure 11 illustrates a tapered piston ring; and

Figure 12 is a detail similar to Figure 4 showing the relation of one of the struts holding the parts of the piston together and the groove in the piston.

Referring now in detail to the drawings, Figure 1 illustrates a piston as a whole at 12. For convenience, the upper part of the piston is indicated at 14 and the lower part at 16, and a cylinder wall is indicated at 18. The upper portion 14 of the piston has a plurality of ring grooves 20 which may be conventional in form, and therefore conventional piston rings 22 are employed.

Below the conventional piston ring grooves 20 is another ring groove 24 of special construction and forming a part of the present invention. The groove 24 is shown as of greater vertical extent than the grooves 20, but, as the description will later reveal, the vertical height of the groove 24 is not critical. It will be understood that certain proportions and relationships are exaggerated for the purpose of clarity and specific relationships will be significant only as specifically referred to.

The lower ring groove 24 (Figs. 4 and 5), includes an upper surface 26, a vertical surface 28 forming the floor of the groove, and a bottom surface 30. The bottom surface 30 terminates radially outwardly at the point 32 (Figure 6) and it will be noted that this radially outer edge of the bottom surface 30 is disposed inwardly of the main portion of the piston. A space 34 (Figs. 4 and 5) is indicated between the upper portion of the piston and the cylinder wall. This space is greatly exaggerated, and it will be understood that this space is normally not detectable by the eye, but there is, nevertheless, an appreciable space when considered in micrometer measurements. Another space 36 is indicated between the lower portion 16 and the cylinder wall and this space is less than the space 34 as is well understood by those familiar with the usual construction of pistons. The point 32 therefore terminates radially outwardly at a point disposed inwardly from the outer surface of the piston with respect to both the upper and lower portions of the piston and consequently at a considerable space from the cylinder wall.

Immediately below the ring groove 24 is a peripheral groove 38 which entirely surrounds the piston and extends downwardly and inwardly, communicating with the interior of the piston. The groove 38 is formed by a lathe operation and as a result of its inclined position the point 32 is formed. In other words, the upper surface of the peripheral groove 38 is substantially coincident with the outer marginal edge of the bottom surface 30 of the ring groove. The point 32 does have a slightly blunted edge, but aside from this fact, the two surfaces mentioned above do converge.

The peripheral groove 38 defines the demarcation line between the upper and lower portions of the piston, and means of course provided to secure the two portions together. In the mold for casting the piston, lugs or struts 40 are formed integral with the portions of the pistons. In the molding or casting process, wrist pin bearings 42 are formed and extending upwardly from the bearings 42 are additional struts 44 inter-connected by a web 46. The struts 44 and web 46 form additional means for securing the two portions of the piston together, and while they are of greater width than the struts 40, they do not detract appreciably from the general open and continuous feature of the groove 38. For practical purposes, the groove 38 is continuous around the piston, having communication with the interior of the piston at substantially all points thereround.

The ring grooves 20 and 24 and the peripheral groove 38 can all be formed by a lathe operation and it is pertinent to point out here that in the formation of the piston, expensive milling processes are eliminated, thus making for more economical manufacturing.

A piston ring 48 is placed in the groove 24. The cross-sectional contour of the ring 48 is preferably rectangular, similar to conventional rings. However, the ring 48 is provided with a circumferential groove 50 (Figs. 4, 5 and 6) cut in the under surface of the ring adjacent its outer peripheral edge. Reference is directed to Figure 6 showing the groove 50 in enlarged detail. The outer marginal edge of the groove 50 indicated at 52 is closely adjacent the outer peripheral surface of the ring. The numeral 54 indicates the radially inner portion of the groove 50 and particular attention is directed to this portion 54. The portion 54 terminates in the plane of the under surface of the ring at a point disposed radially outwardly beyond the outer edge of the bottom surface 30 of the ring groove or the point 32. Thus, the downward extension of portion 54 as indicated by the dot-dash line 56 is disposed radially outwardly beyond the point 32 or beyond the outer edge of the bottom surface 30 of the ring groove.

Comparison of Figures 4 and 5 will show that the ring has limited vertical movement in the ring groove. On the up stroke of the piston, the ring bears against the bottom surface 30 as shown in Figure 4, and on the down stroke the ring bears against the upper surface 26, as shown in Figure 5. There is also a space between the inner surface of the ring and the floor 28 of the ring groove. These spaces are, of course, exaggerated in the illustrations. The curvature of the groove 50 in cross-section is such that regardless of the vertical position of the ring in the groove the projection of the surface 54 as indicated by the line 56 is always disposed radially outwardly beyond the point 32.

Due to the shape and disposition of the groove 38, the outer marginal edge thereof 58 (the counter part of the point 32) is disposed below the bottom surface 30 of the ring groove.

However, I also contemplate forming the peripheral groove in the shape indicated at 60 in Figure 7. In this instance, the size and inclination of the groove 60 is such that the outer point 62 which corresponds with the point 58 terminates substantially in the plane of the bottom surface 30 of the ring groove. In other respects, the embodiment illustrated in Figure 7 is similar to that in Figures 4 and 5, and it will be understood that the peripheral groove may be formed so as to assume any stage intermediate the groove 60 of Figure 7 and the groove 38 of Figures 4 and 5.

Figure 8 illustrates a groove 64 cut in the ring so that the inner marginal edge of the groove is disposed in the plane of the under surface of the ring, and the outer edge is disposed in the outer peripheral surface of the ring. The line 66 indicates the downward projection of the portion of the groove defining the inner marginal edge thereof, and in this case also the projection in all positions of the ring is disposed radially outwardly beyond the bottom surface 30 of the ring groove.

Figure 9 illustrates a slightly different kind of piston ring. The piston ring is provided with a circumferential projection 68 formed on the under surface of the ring and disposed radially outwardly beyond the outer edge of the bottom surface 30 and, of course, the main portion of the ring is adapted to bear against the surface 30 with the projection 68 extending therebelow. Formed in the under surface of the projection 68 is a circumferential groove 70, and in this instance also the downward projection of the inner edge of the groove is disposed outwardly beyond the radially outer edge of the bottom surface 30 of the ring groove. The form of ring illustrated in Figure 9 can be employed with pistons having peripheral grooves either of the form indicated at 60 or that indicated at 38.

Figure 10 shows a piston ring 48 with a modified peripheral surface having a projection 72 formed by a cutaway portion thereabove.

Figure 11 illustrates a ring 48 having a tapered surface 74.

The rings of Figures 10 and 11 can be used with any of the piston constructions shown. In either of these two forms of ring, there is a reduced surface which bears on the cylinder wall 18, and as a consequence, increased pressure is exerted on the cylinder wall in that area where the ring engages the wall. The greater pressure exerted insures that a minimum, if any excess oil passes between the ring and cylinder wall, and with the other advantages enumerated above, such as the groove 50 directing the oil into the groove 38, a most effective piston and ring construction is accomplished, in which minimum oil necessary for top cylinder lubrication passes into the combustion space.

In connection with the ring of Figure 10, the increased pressure brought about by the reduced area of the projection 72 assures a perfect seal against the passage of excess oil; the difference in diameter between the projection and the cutaway portion need be only a few thousandths of an inch and when the projection wears down, the whole surface bears on the cylinder wall, but by that time the rings are seated by wear against the cylinder wall, and there is no need for increased pressure in a localized area. Thus there is a perfect seal initially, and a continuing perfect seal as the ring wears. Thus for controlling the oil at various speeds of the piston, different widths of the surface engaging the cylinder wall may be provided; a decrease of width results in an increase of pressure per unit area, and makes more positive the deflection action in removing the oil.

In any of the instances above, the projection of the inner edge of the groove in the ring as indicated by the lines 56 and 66 need not be parallel with the inner surface of the peripheral groove, the only condition being that they are disposed outwardly beyond the outer edge of the bottom surface 30 of the ring groove.

From the above detailed description, it will be evident that the objects of the invention can be effectively accomplished. As stated in the introduction, there are three fundamental, but important, considerations to be taken into account:

a. A material is to be moved;

b. A place is provided for the material to be moved to;

c. A means is provided for moving the material to the place desired.

A film of oil forms on the cylinder wall each time that the piston moves upwardly. When the piston moves downwardly, it is of course always intended that the ring wipe or scrape the oil off of the cylinder wall and carry it down into the crank case. The piston moves at a considerable speed and when it encounters the film of oil the oil piles up ahead of the ring and in the down stroke the ring assumes the position shown in Figure 5. In the case of previously known types of pistons and rings, the oil piling up ahead of the ring is then forced into the groove below the ring and follows its course past the ring through the groove behind the ring. The present invention prevents such a phenomenon. The circumferential groove, such as 50, forms a relatively sharpened outer edge which engages the cylinder wall and this sharpened edge scrapes the oil off of the cylinder wall and deflects it. The oil then follows around the groove in the ring and is forced out of the groove in the directions indicated by the projection lines 56 or 66. Since the inner edge of the groove in the ring is disposed outwardly beyond the bottom surface 30 in all positions of the piston, the oil is effectively prevented from entering into the space between the ring and the surface 30 and instead is deflected downwardly into the peripheral groove 38.

The general open-work nature of the peripheral groove 38 enables oil to freely pass into the interior of the piston. This groove must preferably be as nearly continuous as possible, broken only by the struts which are necessary to hold the portions of the piston together. Any oil which strikes the struts 40 or the elements 44, 46 is deflected circumferentially and permitted to pass through the open portion of the groove. Attention is directed to Figure 12 which shows one of the struts 40 and its relation to the peripheral groove 38. It will be noted that the bottom surface of the peripheral groove 38 forms a relatively wide angle with the strut, with the consequence that there is ample space in the peripheral groove outwardly of the strut to receive oil, whereby a great quantity of oil can be received and then the oil flows laterally off of the strut into the interior of the piston. For all practical purposes, in the present case, the peripheral groove 38 (as well as 60) is open continuously around the piston.

The ring can be made to engage the cylinder wall with sufficient pressure to assure that no oil will pass between the ring and the cylinder wall except the thinnest film necessary for proper lubrication, and since no oil pressure forces the oil through the grooves around the rings, a perfect excess oil return is accomplished. Also, it might be pointed out that the tendency of the vacuum created in the combustion space on the intake stroke will not pull the oil to excess into the combustion chamber because the excess oil has been kept from the ring grooves and piston walls by deflection into the peripheral groove 38 and is prevented from encountering the bottom surface 30 of the ring groove.

By comparison with certain previous and less satisfactory piston and ring constructions, it will be noted that the ring groove does not have any opening communicating with the interior of the piston. Such a construction in which the ring groove is provided with an opening is almost entirely devoid of effectiveness for the purpose intended, and it even increases the seriousness of the condition which is attempted to be obviated in many cases. In such a previous construction, on the up stroke of the piston when the piston ring is seated against the bottom surface of the groove, there is a direct passage between the opening in the groove and the space between the piston and cylinder wall. There is continuous splashing of oil in the crank case and as a consequence oil passes through the opening in the ring groove and on through the groove into the space between the piston and cylinder wall and then into the combustion space. Conversely, on the power stroke, the gases of combustion find their way through the same passages in the reverse direction. This is made more obvious when it is considered that at the end of the compression stroke the ring is disposed in the bottom of the groove and before the piston begins its power stroke so that the ring would be at the top of the groove, the gases of combustion pass between the ring and the upper surface of the groove and on through the opening in the groove.

In order to carry out the above advantages to a further degree, I provide a groove 76 in the under surface of the piston. As the piston descends, the groove 76 is effective for wiping or scraping off a certain portion of the film of oil from the cylinder wall, and although the ultimate control is effected by the piston ring, the groove 76 aids in that direction.

While I have herein shown and described preferred embodiments of my invention, manifestly it is susceptible of modification and re-arrangement of the parts without departure from the spirit and scope thereof. I do not therefore wish to be understood as limiting my invention to the precise forms herein disclosed, except as I may be so limited by the appended claims:

I claim as my invention:

1. A piston and piston ring construction, comprising, a piston having a ring groove, a ring in said groove, the bottom surface of said groove terminating radially inwardly from the main surface of the piston, said piston having a peripheral groove generally below said ring groove and communicating with the interior of the piston, said ring having a circumferential groove in its under surface, the radially inner edge of said circumferential groove being disposed outwardly beyond the radially outer edge of the bottom surface of said ring groove.

2. In a construction of the character described, the combination comprising, a piston having a ring groove, a ring in said groove, said ring having a limited amount of vertical movement in said groove in the normal operation of the piston, the bottom surface of said groove terminating radially inwardly from the main peripheral surface of the piston, said piston having a peripheral groove generally below said ring groove and communicating with the interior of the piston, said ring having a circumferential groove in its under surface, the portion of said circumferential groove, as determined by its cross section, defining the radially inner termination of the groove, being so shaped that a line extending the projection downwardly of said portion is disposed radially outwardly of the outer edge of the lower surface of said ring groove in all vertical positions of said ring in said ring groove.

3. In a construction of the character described, the combination comprising, a piston having a ring groove, a ring in said groove, said ring having a limited amount of vertical movement in said groove in the normal operation of the piston, the bottom surface of said groove terminating radially inwardly from the main peripheral surface of the piston, said piston having a peripheral groove generally below said ring groove and communicating with the interior of the piston, said ring having a circumferential groove in its under surface, the radially inner and outer edges of said circumferential groove being disposed in the plane of the under surface of said ring, the portion of said circumferential groove, as determined by its cross section, defining the radially inner termination of the groove, being so shaped that a line extending the projection downwardly of said portion is disposed radially outwardly of the outer edge of the lower surface of said ring groove in all vertical positions of said ring in said ring groove.

4. A piston and piston ring construction, comprising, a piston having a ring groove, a ring in said groove, the bottom surface of said groove terminating radially inwardly from the main surface of the piston, said piston having a peripheral groove generally below said ring groove, said peripheral groove, for all practical purposes, having communication with the interior of the piston at all points around the piston, said ring having a circumferential groove in its under surface, said circumferential groove being disposed totally radially outwardly of the lower surface of said ring groove.

5. A piston and piston ring construction comprising, a piston having a ring groove, a ring in said groove, the bottom surface of said groove terminating radially inwardly from the main surface of the piston, said piston having a peripheral groove generally below said ring groove and communicating with the interior of the piston, said ring having a circumferential groove in its under surface, the radially inner edge of said circumferential groove lying in the plane of the under surface of the ring and being disposed outwardly beyond the radially outer edge of the bottom surface of said ring groove, and the radially outer edge of said circumferential groove lying in the outer peripheral surface of the ring.

6. In a construction of the character described, the combination comprising, a piston having a ring groove, a ring in said groove, the outer edge of the bottom surface of said groove being disposed radially inwardly of the main surface of the piston, said piston having a peripheral groove generally below said ring groove and communicating with the interior of the piston at substantially all points circumferentially of the piston, the inner edge of said peripheral groove being substantially coincident with the outer edge of the bottom surface of said ring groove, said ring having a circumferential groove in its under surface, the radially inner edge of said circumferential groove being disposed radially outward beyond the outer edge of the bottom surface of said ring groove.

7. In a construction of the character described, the combination comprising, a piston having a ring groove, a ring in said groove, the outer edge of the bottom surface of said groove being disposed radially inwardly of the main surface of the piston, said piston having a peripheral groove generally below said ring groove and communicating with the interior of the piston at substantially all points circumferentially of the piston, said peripheral groove being inclined downwardly inwardly of the piston, the inner edge of said peripheral groove being substantially coincident with the outer edge of the bottom surface of said ring groove, said ring having a circumferential groove in its under surface, the radially inner edge of said circumferential groove being disposed radially outward beyond the outer edge of the bottom surface of said ring groove.

8. A piston and piston ring construction, comprising, a piston having a ring groove, a ring in said groove, the bottom surface of said groove terminating radially inwardly from the main surface of the piston, said piston having a peripheral groove generally below said ring groove and communicating with the interior of the piston, said ring having a circumferential groove in its under surface, the radially inner edge of said circumferential groove being disposed outwardly beyond and in a plane below the radially outer edge of the bottom surface of said ring groove.

9. A piston and piston ring construction, comprising, a piston having a ring groove, a ring in said groove, the bottom surface of said groove terminating radially inwardly from the main surface of the piston, said piston having a peripheral groove generally below said ring groove and communicating with the interior of the piston, said ring having a circumferential projection on its under surface disposed radially outward beyond the radially outer edge of the bottom surface of said ring groove, said projection extending below the bottom surface of said ring groove, said projection having a circumferential groove in its under surface, the portion of said circumferential groove, as determined by its cross section, defining the radially inner termination of the groove, being so shaped that the projection downwardly of said portion is disposed radially outwardly of the outer edge of the lower surface of said ring groove.

10. A piston and piston ring construction, comprising, a piston having a ring groove, a ring in said groove, said ring having a portion of its peripheral surface disposed radially inwardly of the outermost radial extent of the ring, the bottom surface of said groove terminating radially inwardly from the main surface of the piston, said piston having an inclined peripheral groove below said ring groove and communicating with the interior of the piston, said ring having a circumferential groove in its under surface, the radially inner edge of said circumferential groove being disposed outwardly beyond the radially outer edge of the bottom surface of said ring groove, and said circumferential groove being positioned transversely across the inclined projection of said inclined peripheral groove.

11. A piston and piston ring construction, comprising, a piston having a ring groove, a ring in said groove, said ring having a first portion of its peripheral surface adapted to engage the cylinder wall and a cut-away portion disposed radially inwardly from said first portion, the bottom surface of said groove terminating radially inwardly from the main surface of the piston, said piston having a peripheral groove generally below said ring groove and communicating with the interior of the piston, said ring having a circumferential groove in its under surface, the radially inner edge of said circumferential groove being disposed outwardly beyond the radially outer edge of the bottom surface of said ring groove.

12. A piston and piston ring construction, comprising, a piston having a ring groove, a ring in said groove, said ring having a tapered peripheral surface, the bottom surface of said groove terminating radially inwardly from the main surface of the piston, said piston having a peripheral groove generally below said ring groove and communicating with the interior of the piston, said ring having a circumferential groove in its under surface, the radially inner edge of said circumferential groove being disposed outwardly beyond the radially outer edge of the bottom surface of said ring groove.

13. A piston and piston ring construction, comprising a piston having a ring groove, a ring in said groove, said ring having a first portion of its peripheral surface adapted to engage the cylinder wall, and a cut-away portion disposed above and radially inwardly from said first portion, the bottom surface of said groove terminating radially inwardly from the main surface of the piston, said piston having a peripheral groove generally below said ring groove and communicating with the interior of the piston, said ring having a circumferential groove in its under surface, the radially inner edge of said circumferential groove being disposed outwardly beyond the radially outer edge of the bottom surface of said ring groove.

14. In a construction of the character described, the combination comprising, a piston having a ring groove, a ring in said groove, the outer edge of the bottom surface of said groove being disposed radially inwardly of the main surface of the piston, said piston having a peripheral groove generally below said ring groove and communicating with the interior of the piston at substantially all points circumferentially of the piston, said ring having a circumferential groove in its under surface and adjacent its outer surface so that the outer edge of said circumferential groove scrapes oil from the cylinder wall as the ring travels in one direction relative thereto and changes the course of the oil by deflection whereby it discharges into said peripheral groove of said piston, the upper surface of said peripheral groove being located inwardly of the line of deflection of the oil.

15. In a construction of the character described, the combination comprising, a piston having a ring groove, a ring in said groove, the outer edge of the bottom surface of said groove being disposed radially inwardly of the main surface of the piston, said piston having a peripheral groove generally below said ring groove and communicating with the interior of the piston at substantially all points circumferentially of the piston, said ring having a circumferential groove in its under surface, and adjacent its outer surface so that the outer edge of said circumferential groove scrapes oil from the cylinder wall as the ring travels in one direction relative thereto and changes the course of the oil by deflection whereby it discharges into said peripheral groove of said piston, the upper surface of said peripheral groove being located inwardly of the line of deflection of the oil, and the lower surface of said peripheral groove being located outwardly of said line of deflection.

16. In a construction of the character described, the combination comprising, a piston having a ring groove, a ring in said groove, the outer edge of the bottom surface of said groove being disposed radially inwardly of the main surface of the piston, said piston having a peripheral groove generally below said ring groove and communicating with the interior of the piston at substantially all points circumferentially of the piston, said ring having a circumferential groove in its under surface, and adjacent its outer surface so that the outer edge of said circumferential groove scrapes oil from the cylinder wall as the ring travels in one direction relative thereto and changes the course of the oil by deflection whereby it discharges at a downward and inward angle into and through said peripheral groove of said piston, the upper surface of said peripheral groove being inclined downwardly and inwardly and located inwardly of the line of deflection of the oil.

17. In a construction of the character described, the combination comprising, a piston having a ring groove, a ring in said groove, the outer edge of the bottom surface of said groove being disposed radially inwardly of the main surface of the piston, said piston having a peripheral groove generally below said ring groove and communicating with the interior of the piston at substantially all points circumferentially of the piston, said ring having a circumferential groove in its under surface, and adjacent its outer surface so that the outer edge of said circumferential groove scrapes oil from the cylinder wall as the ring travels in one direction relative thereto and changes the course of the oil by deflection whereby it discharges at a downward and inward angle into and through said peripheral groove of said piston, the upper surface of said peripheral groove being inclined downwardly and inwardly and located inwardly of the line of deflection of the oil, and the lower surface of said peripheral groove being inclined downwardly and inwardly and located outwardly of said line of deflection.

18. A piston construction comprising a piston having a ring groove, the bottom surface of said groove terminating radially inwardly from the main surface of the piston, said piston having a continuous peripheral groove inclined radially inwardly and communicating with the interior of the piston, and the inclined projection of said inclined peripheral groove intersecting the horizontal projection of said ring groove within the cylindrical projection of said main piston surface.

19. A piston and piston ring construction comprising a piston having a ring groove, a ring element in said groove, said ring element having a circumferential groove in its under surface, said piston having a continuous peripheral groove inclined radially inwardly and communicating with the interior of the piston, and the circumferential groove of said ring element being positioned transversely across the inclined projection of said inclined peripheral groove.

CARL W. HOLLINGSWORTH.

REFERENCES CITED

The following references are of record in the file of this patent:

UNITED STATES PATENTS

| Number | Name | Date |
|---|---|---|
| 1,232,846 | Rohn | July 10, 1917 |
| 1,489,180 | Weidely | Apr. 1, 1924 |
| 1,529,589 | Herbrard | Mar. 10, 1925 |
| 1,730,120 | Jardine | Oct. 1, 1929 |
| 1,757,230 | Barker | May 6, 1930 |

FOREIGN PATENTS

| Number | Country | Date |
|---|---|---|
| 75,489 | Switzerland | Jan. 9, 1917 |
| 368,885 | Great Britain | Mar. 17, 1932 |
| 80,419 | Sweden | Mar. 15, 1934 |